United States Patent
Desbois et al.

(10) Patent No.: US 6,460,336 B1
(45) Date of Patent: Oct. 8, 2002

(54) HYDRAULIC CYLINDERS

(75) Inventors: Patrick Desbois, Olivet; Yannick Thenault, Ferrieres en Gatinais, both of (FR)

(73) Assignee: Automotive Products France, SA, Pontoise (FR)

( * ) Notice: Subject to any disclaimer, the term of this patent is extended or adjusted under 35 U.S.C. 154(b) by 0 days.

(21) Appl. No.: 09/557,887

(22) Filed: Apr. 21, 2000

(30) Foreign Application Priority Data

Apr. 23, 1999 (GB) ............................................. 9909277

(51) Int. Cl.$^7$ .................................................. F15B 7/00
(52) U.S. Cl. ........................................... 60/585; 60/588
(58) Field of Search .................................... 60/585, 588

(56) References Cited

U.S. PATENT DOCUMENTS

| 3,141,303 A | * | 7/1964 | Baldwin | ....................... 60/588 |
| 4,566,276 A | * | 1/1986 | Komorizono et al. | ......... 60/585 |
| 4,959,188 A | * | 9/1990 | Leigh-Monstevens | ....... 264/255 |
| 5,535,590 A | * | 7/1996 | Nies | ............................. 60/588 |

FOREIGN PATENT DOCUMENTS

JP  55044817 A * 3/1980
JP  62253422 A * 11/1987

* cited by examiner

*Primary Examiner*—Edward K. Look
*Assistant Examiner*—Thomas E. Lazo
(74) *Attorney, Agent, or Firm*—Paul E Milliken; Ray L Weber

(57) ABSTRACT

A housing (2) for a master cylinder (1) having a bore (3) in which a piston (4) is slideable to pressurize fluid ahead of a main seal (5) on the piston for the supply of pressurized fluid to an outlet (10). Two inlet openings (7,8) are provided into the bore, a first opening (7) for recuperation of fluid from an associated reservoir to that part (6) of the bore ahead of the main piston seal (5) when the piston is in a retracted position and a second opening (8) placing that portion (11) of the bore between the main piston seal and a second piston seal (9) behind the main seal in permanent communication with the reservoir. The housing also has an external inlet connection (41) formed integrally with the housing. The inlet connection has a free end for direct connection with a conduit (41a) connected with the associated reservoir and having a passage (42) for connection with the conduit which opens into the housing bore at the first (7) and second (8) openings. The configuration of the passage and the first and second openings is such that the passage (42) and the first and second openings (7,8) can be formed by a single moulding core (60).

4 Claims, 4 Drawing Sheets

HYDRAULIC CYLINDERS

This invention relates to hydraulic cylinders and in particular to constructional details of master cylinders which facilitate their manufacture from plastics material by injection moulding.

Conventionally injection moulded master cylinders include a housing with a bore in which a piston is slideable to pressurise fluid ahead of a main seal on the piston for the supply of pressurised fluid to an outlet, two inlet openings are provided into the bore, a first opening for recuperation of fluid from an associated reservoir to that part of the bore ahead of the main piston seal when the piston is in a retracted position and a second opening placing that portion of the bore between the main piston seal and a second piston seal behind the main seal in permanent communication with the reservoir. Such a master cylinder is hereinafter referred to as "a master cylinder of the type described".

It is difficult to injection mould a housing of a master cylinder of the type described and in particular the formation of the two inlet openings and the connection with the associated reservoir is problematical resulting in the necessity for the housing to be moulded in two or more parts which must be subsequently secured together either mechanically or by welding or adhesive. This significantly affects the ease and cost of manufacture of the master cylinder housing.

It is an object of the present invention to provide a housing for a master cylinder of the type described which is easier to produce by injection moulding.

Thus according the invention there is provided a housing for a master cylinder of the type described having an external inlet connection formed integrally with the housing, the inlet connection having a free end for direct connection with a conduit connected with the associated reservoir and having a passage for connection with the conduit which opens into the housing bore as the first and second openings, the housing being characterised in that the configuration of the passage and the first and second openings being such that the passage and the first and second openings can be formed by a single moulding core.

The second opening is preferably larger than the first opening to allow the passage of fluid back and forth between the reservoir and the portion of the bore between the main and secondary piston seals with the minimum of restriction to avoid hysteresis in the operation of the master cylinder and to assist in filling of the master cylinder as described hereinafter.

The second opening may be elongate in shape along an axis parallel to the longitudinal axis of the housing.

The invention also provides a method of injection moulding a housing for a cylinder of the type described, the method being characterised by comprising the steps of
  injecting plastics material into a mould defining the external shape of the housing including an external inlet connection with a free end for direct connection with a conduit connected with the associated reservoir, said mould having a first core means defining the housing bore and a second core means defining an inlet passage of the inlet connection and the first and second openings;
  curing the plastics in the mould;
  removing said first and second core means; and,
  removing said moulded housing from said mould.

The present invention further provides an hydraulic master cylinder of the type described having a housing of the form described above or produced in accordance with the above described injection moulding method.

One embodiment of a master cylinder of the type described according to the invention will now be described, by way of example only, with reference to the accompanying drawing in which.

Figure 1:
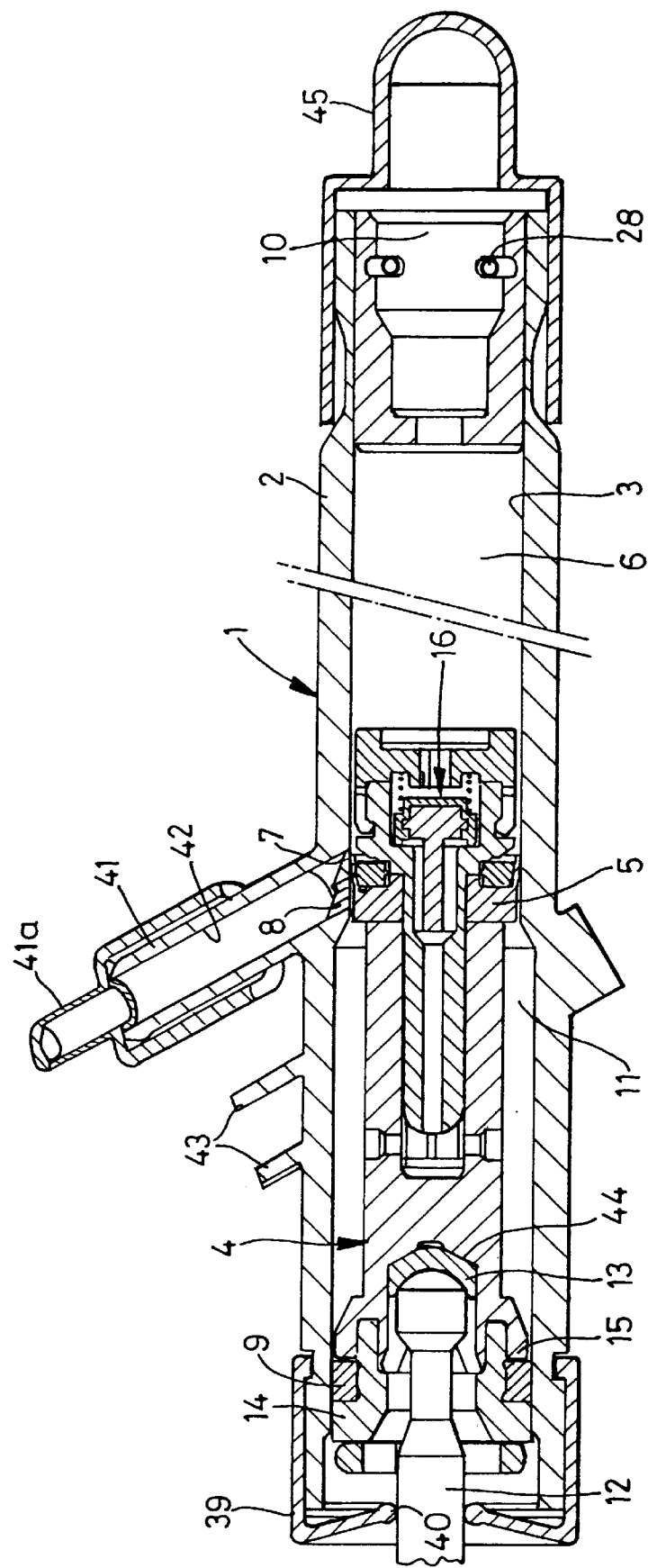
FIG. 1 shows in cross section a master cylinder of the type described according to the invention.
Figure 2:
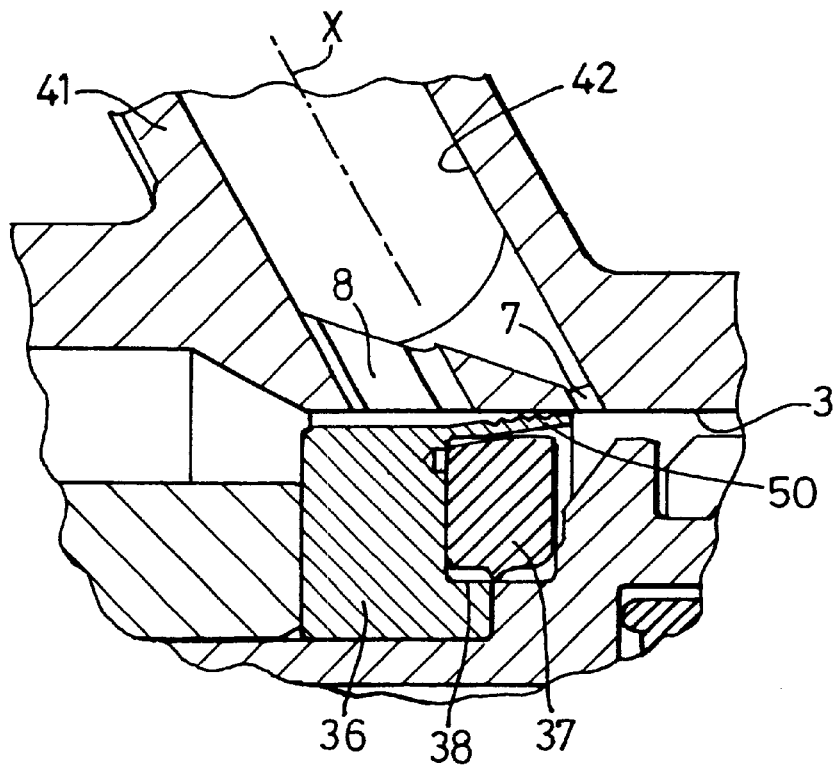
FIG. 2 shows in larger scale details of part of the cylinder in FIG. 1.
Figure 3:
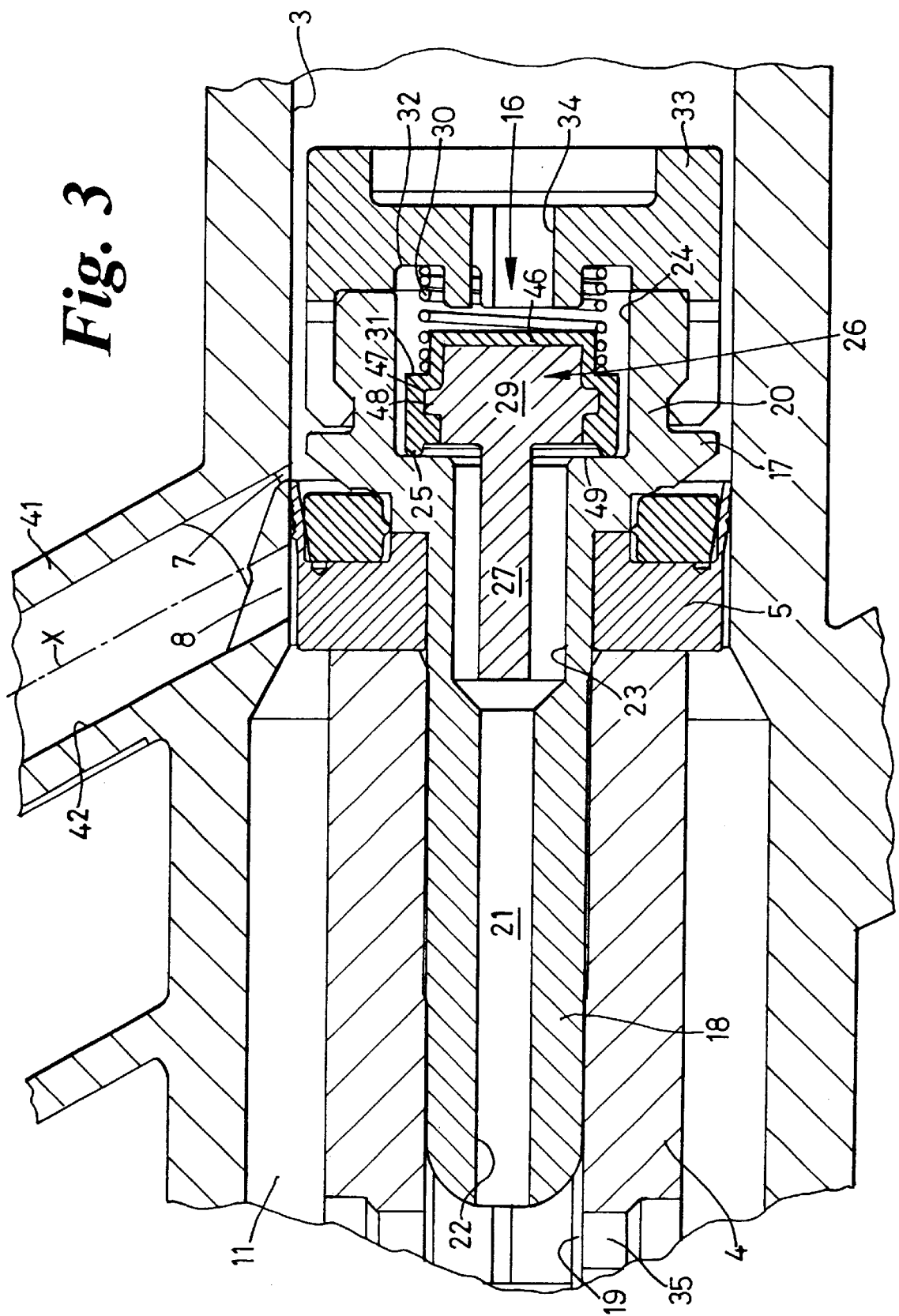
FIG. 3 shows in larger scale details of a valve incorporated into the piston of the cylinder in FIG. 1.

FIG. 1 shows a master cylinder of the type described which is designated generally as 1. The master cylinder 1, which may form part of an hydraulic system for the operation of a vehicle clutch, comprises a plastics housing 2 produced using injection moulding techniques. The housing 2 defines a bore 3 in which a piston 4 is slideable so as to pressurise fluid in a working chamber 6 of the bore 3 ahead of the main piston seal 5 for the supply of pressurised fluid to an outlet 10. The housing has two inlet openings into the bore 7, 8. The first inlet opening 7 is provided for recuperation of fluid from an associated reservoir (not shown) into the working chamber 6 when the piston 4 is in a retracted position as shown in FIGS. 1 to 3. The second inlet opening 8 is in permanent communication with a secondary chamber 11 formed in that part of the bore between the main piston seal 5 and a secondary piston seal 9 behind the main piston seal 5. The details of the inlet openings 7, 8 and the filling and operation of the master cylinder will be discussed in more detail later.

The piston 4 is formed of plastics material and is connected to an operating pedal (not shown) of an automotive vehicle clutch by means of an operating rod 12. One end of the rod 12 is received and held in a nylon socket 13 located in a recess 44 formed at the rearward end of the piston 4. The end of the rod 12 and the socket 13 are formed such as to permit pivotal movement of the rod 12 relative to the socket 13. The socket 13 is held in recess 44 by an end cap 14 which is secured to the piston 4 by means of a snap connection 15 or by any other suitable means such as a threaded connection or by welding or adhesive. The secondary piston seal 9 is held in position between the end cap 14 and the piston 4. A protective seal 39 locates around the rearward end of the housing 2 and has a hole 40 through which the rod 12 passes.

A valve assembly 16 (FIG. 3) is provided at the forward end of the piston 4. The valve assembly comprises a valve body 17 having an elongate portion 18 which is a push fit in a blind bore 19 formed in the forward end of the piston 4. The valve body 17 has a larger diameter shoulder portion 20 which holds the main piston seal 5 in position against the piston 4. The valve body 17 has a stepped bore 21 formed therethrough comprising three sections 22, 23, 24 of increasing diameter. The second and third sections 23, 24 of the stepped bore 21 house a valve 26. The valve 26, which may be of plastics or metal, has an elongate section 27 which locates in the second section 23 of the stepped bore 21 and a wider diameter section 29 which locates in the third section 24 of the stepped bore 21. Partially surrounding the wider diameter section 29 is a cover member 46 which is made of rubber or a relatively soft plastics material. The cover member 46 is located on the wider diameter section 29 by means of an annular groove 47 formed on an inner diameter thereof for cooperation with an annular ridge 48 formed on the outer diameter of the wider diameter section 29. The cover member 46 is provided with an annular ridge 25 on a rearward end face. The ridge 25 seals on a forward face 49 formed between the second and third sections 23, 24 of the stepped bore 21 when the valve 26 is in a closed position.

The valve 26 is urged to the closed position by a spring 30. One end of the spring 30 engages an annular shoulder 31 formed on the cover member 46. The other end of the spring 30 is located on an annular shoulder 32 on the rearward face of a cap member 33 attached to the shoulder portion 20 of the valve body 17. The cap member 33 is a snap fit on the shoulder portion 20 of the valve body 17 and has a stepped bore 34 forming a fluid connection between the working chamber 6 and the stepped bore 21 of the valve body 17. The bore 19 in the piston is in fluid connection with the secondary chamber 11 by means of one or more radial bores 35 formed at the closed rearward end of the piston bore 19.

It should be noted that other means of attaching the cap member 33 to the shoulder portion 20 of the valve seat member 17 could be employed. For example a threaded connection could be used or the cap member 33 could be welded or stuck to the shoulder portion 20 using adhesive.

The main piston seal 5 (shown in more detail in FIG. 2) comprises a plastics seal element 36 having a surface 50 which is urged into contact with the bore 3 of the housing 2 by an elastomeric insert 37 located in a recess 38 in the seal element 36. In an alternative embodiment, not shown, the seal element 36 is formed integrally with the piston. Seals of the type in which a plastics sealing element is radially outwardly biased into contact with a bore by a resilient insert are disclosed and clamed in the applicants European patent application No: 98116504.6 to which the reader is referred if more details are required. The precise form of seal, however, is not essential to the invention and any other suitable form of seal may be used.

The housing outlet 10 is in fluid connection with the working chamber 6 and comprises a quick fit connector 28 for connection with a conduit (not shown) which conduit interconnects the master cylinder 1 with the remainder of the hydraulic actuation system which might for example comprise a clutch slave cylinder (not shown). In FIG. 1 a protective cap 45 is shown covering the outlet. This cap 45 is used to prevent ingress of contaminants into the master cylinder 1 prior to the cylinder being fitted on a vehicle and connected to a conduit.

An external inlet connection 41, for connection with an associated reservoir (not shown) via a conduit 41a, is formed integrally with the housing 2. The inlet connection has a passage 42 and first and second inlet openings 7, 8 which open into the bore 3. The associated reservoir may be shared between the hydraulic system of which the master cylinder 1 is part and another hydraulic system on the same vehicle. For example the reservoir might serve both the clutch hydraulic system and the brake hydraulic system. Alternatively, the reservoir might solely be associated with the clutch system.

Figure 4:
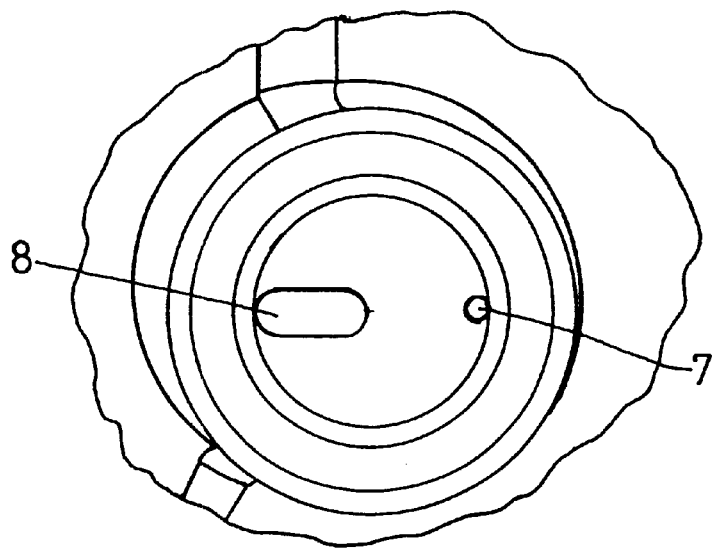
FIG. 4 shows a plan view of the inlet passage showing the two inlet openings; and, FIG. 5 is an isometric view of a second moulding core used to produce a housing according to the invention.
Figure 5:
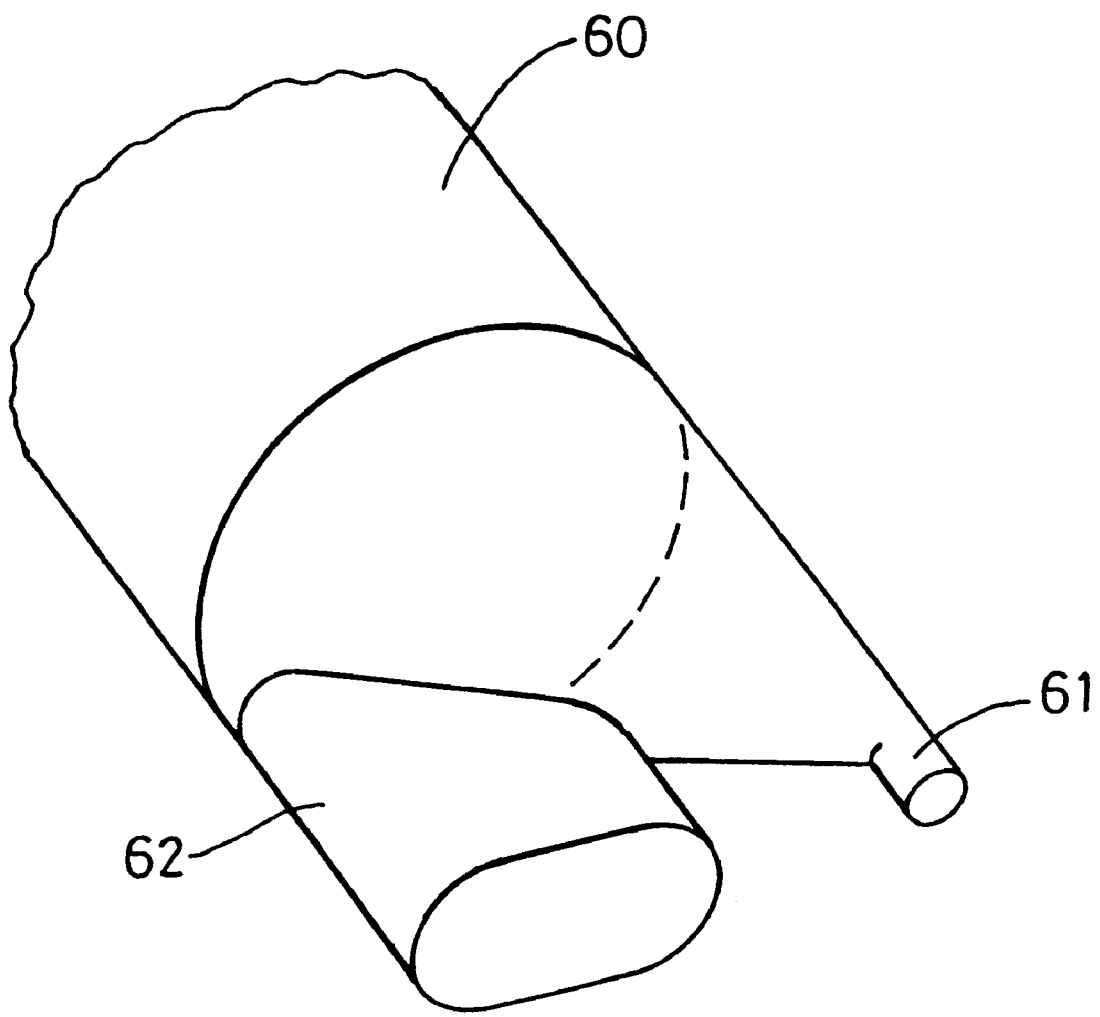

The inlet openings 7, 8 are shown in more detail in FIG. 3. The first inlet opening 7 is formed towards the forward edge of the inlet passage 42, whilst the second inlet opening 8 is formed towards a rearward edge of the inlet passage 42. The longitudinal axis X of the passage 42 is generally parallel with the walls of the first and second inlet openings or the walls of the openings taper inwardly towards the bore 3. Furthermore, the first and second inlet openings are formed in an area within the passage 42. Thus, in accordance with the invention, its is possible to form the inlet passage 42 and the first and second inlet openings 7, 8 in an injection moulding process using a single moulding core 60 typically of the form shown in FIG. 5 in which core projections 61 and 62 form openings 7 and 8 respectively. As can be seen from FIG. 4, the second inlet opening 8 is larger than the first inlet opening 7 and is elongate in shape along an axis parallel to the longitudinal axis of the master cylinder bore 3.

The master cylinder 1 is mounted to the bulkhead of a motor vehicle (not shown) by means of formations 43 formed on the external surface of the housing 2.

Filling of the master cylinder 1 will now be described.

The master cylinder 1 of the described embodiment is supplied and fitted to the motor vehicle in a dry condition. That is to say it is not pre-filled with hydraulic fluid. Once fitted to the vehicle and connected to the remainder of the hydraulic system it is necessary to fill the system with hydraulic fluid. When filling the system the piston 4 must be in the fully retracted position as shown in FIGS. 1 to 3. This equates to the clutch engaged position when the master cylinder 1 forms part of a clutch hydraulic actuation system.

With the piston 4 in the fully retracted position, the main piston seal 5 locates on the piston bore 3 at a position between the first and second inlet openings 7, 8. With the seal in this position, the first inlet opening 7 is in fluid connection with the working chamber 6 whilst the second fluid opening 8 is in fluid connection with the secondary chamber 11. A vacuum is initially applied to inlet passage 42 to draw air out of chamber 6 via opening 7 and out of chamber 11 via opening 8.

After air evacuation hydraulic fluid is introduced into the system under pressure via the inlet passage 42. Some of this fluid will enter directly into the working chamber 6 via the first inlet opening 7. However, most of the fluid will pass through the larger second inlet opening 8 into the secondary chamber 11. The hydraulic fluid passes from the secondary chamber 11 through the radial bores 35 into the bore 19 of the piston 4 and from there through the first and second sections 22, 23 of the stepped bore 21 of the valve body 17. The fluid in the second section 23 of the stepped bore 21 acts on the rearward face of the wider diameter section 29 of the valve 26 and the pressure of the fluid is sufficient to overcome the closing force of the spring 30 and lifts the valve 26 off its seat. This allows the fluid to pass through the third section 24 of the stepped bore 21 around the valve 26 and through the stepped bore 34 of the cap member 33 and into the working chamber 6. From the working chamber 6 the fluid passes through the outlet 10 and via the conduit to the rest of the hydraulic system, for example a clutch slave cylinder from where any air in the system will be bled. Once the hydraulic system is full of hydraulic fluid and all air has been bled, the filling process is complete.

The operation of the master cylinder 1 will now be described.

With the piston 4 in the fully retracted or clutch disengaged position, as shown in FIGS. 1 to 3, the main piston seal 5 will, as has already been described above, adopt a position between the first and second inlet openings 7, 8. When a vehicle operator wishes to disengage the clutch he will depress the clutch pedal in the vehicle which will cause the operating rod 12 to move forwards in a direction to the right as seen in FIG. 1, moving the piston 4 forwardly also. As the piston 4 moves forward the main piston seal 5 will pass over the first inlet opening 7 allowing pressure to be built up in the fluid in the working chamber 6. As the piston continues to move forwardly pressurised fluid is delivered through the outlet 10 and via the conduit (not shown) to the clutch slave cylinder (not shown). During this phase, the first and second inlet openings 7, 8 are in fluid connection with the secondary chamber 11 permitting hydraulic fluid to pass between the secondary chamber 11 and the associated reservoir through the inlet passage 42. The valve 26 in the piston 4 is held closed by the spring 30 and by the pressure of the fluid in the working chamber 6.

Once the operator removes actuation pressure from the operating rod 12, return pressure in the working chamber 6 generated as a result of clutch return forces acting on the slave cylinder acts to move the piston rearwardly, to the left as viewed in FIG. 1. Again, during this phase fluid is able to pass between the secondary chamber 11 and the associated reservoir through the second inlet opening 8 and the inlet passage 42. Once the piston 4 has returned to the fully retracted position, the first inlet opening 7 is in fluid connection with the working chamber 6 allowing fluid to pass into the working chamber to make up for any losses which may have occurred.

What is claimed is:

1. An injection molded master cylinder comprising: a housing having a wall surrounding a bore in which a piston is slidable to pressurize fluid ahead of a main seal on the piston for the supply of pressurized fluid to an outlet, the wall having two inlet openings extending therethrough between the bore and the exterior of the wall, a first opening of the two, for recuperation of fluid from an associated remote reservoir to that part of the bore ahead of the main piston seal which the piston is in a retracted position and a second opening of the two, placing that portion of the bore between the main piston seal and a second piston seal behind the main seal in permanent communication with the reservoir, and an elongated inlet pipe having an inner end integrally molded onto the exterior of the wall of the housing at a location surrounding the two inlet openings, and having an outer end for direct connection with a conduit, which in turn, is connected to the remote reservoir, the inlet pipe having an elongated smooth surface internal passage which is molded simultaneously with the first and second opening by a single molding core.

2. A housing as claimed in claim 1 wherein the second opening (8) is larger than the first opening (7).

3. A housing as claimed in claim 2, wherein the second opening (8) is elongate in shape along an axis substantially parallel to the longitudinal axis of the housing.

4. A method of injection molding a housing for a cylinder as claimed in claim 1 comprising the steps of:

injecting plastics material into a mold defining the external shape of the housing including the inlet pipe extending outwardly from the wall of the housing with the outer end for direct connection with the conduit, which in turn, is connected with the associated remote reservoir, said mold having a first core means defining the housing bore and a second core means defining an inlet passage of the inlet pipe and the first and second openings in the wall of the housing;

curing the plastics in the mold;

removing said first and second core means; and removing said molded housing from said mold.

* * * * *